US010113008B2

United States Patent
Ferro et al.

(10) Patent No.: US 10,113,008 B2
(45) Date of Patent: Oct. 30, 2018

(54) STARCH SETTLING RECOVERY SYSTEM

(71) Applicant: Corn Products Development, Inc., Jabaquara, Sao Paulo (BR)

(72) Inventors: Larry Ferro, Pocatello, ID (US); Christopher Mann, Berwick, PA (US); Kevin Thompson, Shelly, ID (US)

( * ) Notice: Subject to any disclaimer, the term of this patent is extended or adjusted under 35 U.S.C. 154(b) by 93 days.

(21) Appl. No.: 15/271,361

(22) Filed: Sep. 21, 2016

(65) Prior Publication Data

US 2017/0081426 A1    Mar. 23, 2017

Related U.S. Application Data

(60) Provisional application No. 62/221,894, filed on Sep. 22, 2015.

(51) Int. Cl.
| | |
|---|---|
| *C08B 30/08* | (2006.01) |
| *B01D 21/30* | (2006.01) |
| *B01D 21/00* | (2006.01) |
| *B01D 21/24* | (2006.01) |
| *B01D 21/34* | (2006.01) |
| *C02F 1/00* | (2006.01) |
| *B01D 21/26* | (2006.01) |

(52) U.S. Cl.
CPC .......... *C08B 30/08* (2013.01); *B01D 21/0024* (2013.01); *B01D 21/245* (2013.01); *B01D 21/2427* (2013.01); *B01D 21/302* (2013.01); *B01D 21/34* (2013.01); *C02F 1/00* (2013.01); *B01D 21/267* (2013.01); *B01D 2221/06* (2013.01)

(58) Field of Classification Search
CPC ........................... C08B 30/08; B01D 21/0024
See application file for complete search history.

(56) References Cited

U.S. PATENT DOCUMENTS

| | | | |
|---|---|---|---|
| 2,920,635 A | 1/1960 | Wilson | |
| 3,227,278 A * | 1/1966 | Johnson | ............. B01D 21/0042 210/101 |

(Continued)

FOREIGN PATENT DOCUMENTS

WO    WO 2017/048514    *    3/2017

*Primary Examiner* — Douglas B Call
(74) *Attorney, Agent, or Firm* — Jason Grauch; Jacqueline Cohen

(57) ABSTRACT

This invention describes the equipment and a method to recover starch from a dilute starch stream produced by manufacturing facilities which process the starch-containing materials, such as potato and corn. The process comprises feeding a dilute aqueous slurry of less than about 5% by weight starch to a classifier to concentrate the slurry by a factor of at least 5 and produce a concentrated slurry, wherein the classifier has at least one overflow exit and at least one underflow exit; drawing off the overflow and underflow from the classifier; feeding the concentrated slurry from the underflow exit of the classifier into a settling tank having at least one underflow exit and at least one overflow exit to produce an underflow layer of starch with a concentration of at least 40% starch proximate to the underflow exit and an aqueous overflow with a concentration of less than about 5% by weight starch proximate to the overflow exit; drawing off the overflow from the tank; and opening a orifice at the underflow exit of the tank to allow the distal most fraction of the underflow to exit the tank.

14 Claims, 1 Drawing Sheet

(56) References Cited

U.S. PATENT DOCUMENTS

| | | | | |
|---|---|---|---|---|
| 4,036,664 | A * | 7/1977 | Priebe | C08B 30/08 |
| | | | | 127/66 |
| 8,017,019 | B2 | 9/2011 | Becker et al. | |
| 2007/0114483 | A1 * | 5/2007 | Young | F16K 3/0227 |
| | | | | 251/203 |
| 2007/0199903 | A1 * | 8/2007 | Denney | B01D 21/0024 |
| | | | | 210/723 |

* cited by examiner

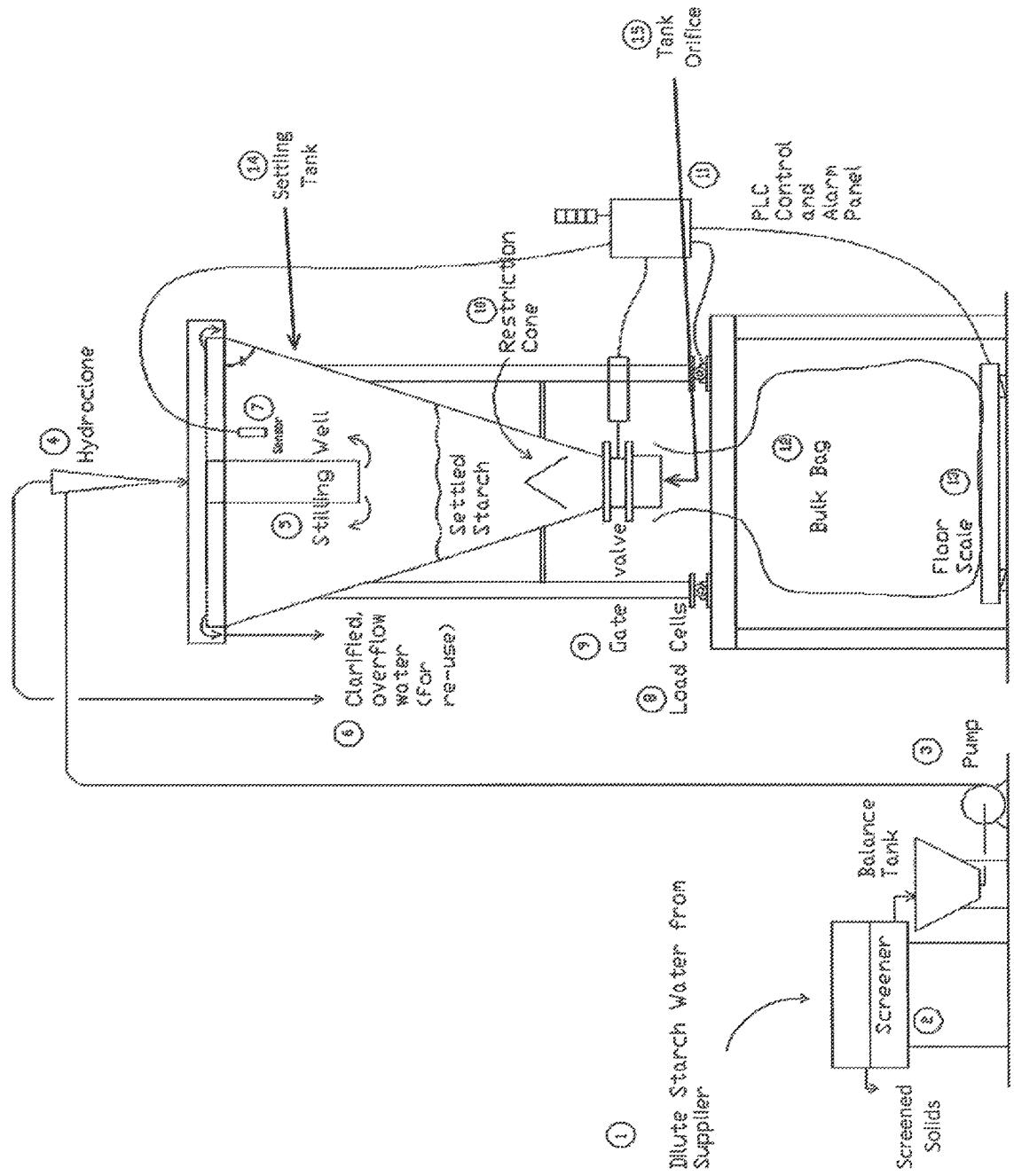

STARCH SETTLING RECOVERY SYSTEM

BACKGROUND

Potato processors often make any number of different cuts to a potato during manufacturing of potato products, such as French fries and potato chips; each cut releases a small amount of starch. The cutting is usually done with some volume of water present to lubricate the cutting knives and drain away the starch. A processor can either choose to send this dilute potato starch water directly to a wastewater system or recover the potato starch. Recovery of the starch is desirable for two reasons: 1) starch companies compensate the manufacturer for the starch; 2) removing the starch from the waste water stream reduces the suspended solids and BOD loading which ultimately reduces the cost of treating that waste water.

Economics, specifically shipping cost, determine what kind of starch recovery system is used. For instance, the distance the manufacturer is from the starch company is often a determining factor as shipping excess water associated with starch cake or slurry is costly.

Current state of the art systems for recovering potato starch involve some or all of the following: 1) screening the dilute starch water, 2) pressurizing and flowing the water through a series of hydrocyclone separators to concentrate the starch, 3) forming a cake from the concentrated starch stream via a rotary vacuum filter and 4) drying that cake into a powder via a flash dryer.

The state of the art system designed to obtain starch slurry uses a screener and hydrocyclones. The state of the art system designed to obtain a starch cake uses a screener, hydrocyclones and a vacuum filter. Finally, the state of the art system designed to produce starch powder uses the screener, the hydrocyclones, vacuum filter and a flash dryer.

All three of the above mentioned systems require a great deal of piping, tanks, valves and various control equipment. Similar systems are used by other manufacturers, such as corn processors, to separate starch from the water used in their manufacturing processes.

SUMMARY OF INVENTION

This invention pertains to a starch recovery system designed to produce starch cake. The invention employs a classifier and a settling tank. No screening, vacuum filters or driers are necessary.

In particular, the invention pertains to a process comprising:

A process comprising:
  a. feeding a dilute aqueous slurry of less than about 5% by weight starch to a classifier to concentrate the slurry by a factor of at least 5 and produce a concentrated slurry, wherein the classifier has at least one overflow exit and at least one underflow exit;
  b. drawing off the overflow and underflow from the classifier;
  c. feeding the concentrated slurry from the underflow exit of the classifier into a settling tank having at least one underflow exit and at least one overflow exit to produce an underflow layer of starch with a concentration of at least 40% starch proximate to the underflow exit and an aqueous overflow with a concentration of less than about 5% by weight starch proximate to the overflow exit,
  d. drawing off the overflow from the tank; and
  e. opening a orifice at the underflow exit of the tank to allow the distal most fraction of the underflow to exit the tank.

The advantage of this invention is that using a classifier combined with a simple tank recovers starch in a mechanically simpler, less energy and labor intensive manner. Further, less capital is required in the form of processing equipment.

BRIEF DESCRIPTION OF THE DRAWINGS

FIG. 1 is a view of one embodiment of the system of the invention from the side showing fluid flows and starch cake collection.

DETAILED DESCRIPTION OF THE INVENTION

Dilute starch water (1) from the processor's manufacturing line, typically from the line's flume or trough carrying waste water, is concentrated in a classifier. Although the invention was designed primarily to remove and collect potato starch from a potato processor's waste water, the invention may be used to remove other types of starch from other types of processing, such as corn starch from a corn canning facility.

Upon entry into the classifier, the dilute starch water contains from 0.1 to 5% (w/w) starch. In one embodiment the dilute starch water contains from 0.1 to 2% (w/w) starch.

Prior to entering the classifier, the dilute starch water optionally may be screened through a screen (2) having sized between US 60 (250 microns)-US 270 mesh (53 microns) the screen may be any number of screeners on the market. In one embodiment, the screening is through a US 60 mesh. In other embodiments, the screening is through US 70 (210 microns), 80 (177 microns), 100 (149 microns), 120 (125 microns), 140 (105 microns), 170 (88 microns), 200 (74 microns), 230 (63 microns), or 270 (53 microns) mesh respectively. The screening removes many non-starch materials, such as foreign matter, pulp and peel. The flow of material through the screen may be at any rate reasonably suited to the system and in one embodiment is at a rate of 50 to 120 gallons per minute. The screened dilute starch water may then be pressurized to at least about 40 psig, in another at least about 70 psig and in yet another in at least 80 psig and up to 140 psig and pumped using pump (3) into a classifier (4).

Classifiers are known in the art and are represented by hydrocyclones, cyclonettes, filters, centrifuges and settling troughs. In one embodiment, the classifer is a hydrocyclone or a cyclonette. The classifier will concentrate the starch in the starch water by a factor of at least 5. In one embodiment the starch water is concentrated by a factor of at least 10, and in another by a factor of at least 20, and in yet another by a factor of at least 30. In one embodiment, the starch water is concentrated by a factor of 5-50, in another embodiment by a factor of 20-40 and in yet another embodiment by a factor of 30-35. In yet a further embodiment, the starch water is concentrated by a factor of about 33.

This concentration greatly reduces the volume of starch water needing further processing. This is important because settling a small volume starch stream is much more economical than settling a large volume starch stream. A single classifier or multiple classifiers may be used as reasonable to accommodate the supplier's waste water flow. If multiple classifiers are used, they may be the same or different. The multiple classifiers may be set up in parallel or in series.

Each classifier will have at least one overflow exit (6) for the majority of the water and lighter density particles, which may include fine pulp and peel. The overflow exit is distal to the settling tank and in one embodiment, is at or near the top of the classifier. Typically, the overflow exit will comprise a tube or pipe to conduct the overflow water away from the classifier. In an alternative, but less typical, embodiment, the overflow is at the top, allowing the concentrated overflow to cascade over the edge of the classifier.

Each classifier will have at least one underflow exit for a more concentrated starch stream. For example, if the classifier concentrates the starch water by a factor of 33, the ratio of underflow to overflow will be approximately 32:1 (v/v). The underflow exit is proximate to the settling tank and in one embodiment, is at or near the bottom of the classifier.

The next step is to settle and concentrate the underflow stream from the classifier, This is accomplished in a settling tank (14). In one embodiment, the settling tank has a "V" or cone shape with a vertical to horizontal aspect ratio sufficient to ensure the starch within the tank does not significantly accumulate on the tank was or tank bottom; that is, the starch properly flows to settle above the settling tank orifice (15). In one embodiment, the vertical to horizontal aspect ratio is at least 1:1, in another embodiment is from 1:1 to 4:1, and in yet another embodiment is from 2:1 to 4:1.

The settling tank is sized for a minimum residence time effective to settle the starch at the bottom of the tank. In one embodiment, the starch is settled for at least sixty minutes and in another embodiment, for at least ninety minutes.

Optionally, the underflow from the classifier enters the settling tank through a stilling well (5) which quiets and disperses the underflow stream evenly throughout the tank.

As the starch settles out of the water, a starch cake is formed at the tank bottom, the clarified water (overflow) may be allowed to cascade over the edge of the tank or, alternatively, may exit the settling tank at or near the top of the tank through an overflow exit. In one embodiment, the overflow exit will comprise a tube or pipe to conduct the overflow water away from the tank. The further from the settled starch, the less starch is in the overflow. The overflow from the settling tank is generally clean enough to be re-used in the manufacturing line. In one embodiment, overflow from the settling tank contains less than 2% (w/w) starch, in another embodiment less than 1% (w/w) starch, in yet another less than 0.5% (w/w) starch, and in still yet another less than 0.25% (w/w) starch. The overflow from the settling tank may optionally be screened or otherwise purified prior to reuse in the manufacturing line.

In order to maintain a desired minimal level of starch in the settling tank, the settled starch is typically measured and quantified. To measure and quantify the starch, a variety of methods known in the art may be used. In one embodiment, an underwater sonar device (7) is employed that senses the top of the settled level of the starch (the interface), sometimes referred to as the "lake bottom". In another embodiment, load cells (8) are used to sense the total weight of the water and the starch. In yet embodiment, both of these systems may be used.

The starch level in the settling tank is typically kept at a level effective to allow only starch cake to exit the settling tank when the exit orifice is open. In one embodiment, the starch level is kept a level of 10-50% of the tank height, in another embodiment at 20-40% of the tank height, and in yet another embodiment at 30-35% of the tank height. The further the starch is from the lake bottom (ie., the bottom of the supernatant fluid), the drier it is. The cake nearest the orifice, therefore, is the driest.

Once a minimal level of settled starch is reached in the tank, the tank orifice (15) may be opened to allow starch cake to exit the tank. The orifice may be opened and closed using any appropriate equipment known in the art and, in one embodiment, a gate valve is used.

When the valve is opened the cake exits the tank. The rate the cake exits may be limited by methods known in the art. In one embodiment, an inverted cone (10) placed just above the tank orifice may be used to slow the rate of starch exiting the tank. This cone may be adjusted to allow the cake to fall around it and restrain it from moving too quickly. If the cake moves too quickly it will form a hollow area in the center of the settled cake volume that will ultimately allow water to break through. This is sometimes known as a "rat hole."

A controller (11) may be used to open or close the orifice, sensing the level of the starch in the cone and opening the orifice when sufficient starch is present. This system maintains a substantially constant starch level in the tank while a continuous flow of underflow liquid from the classifier is fed into the tank. Maintaining a constant starch level is advantageous in that it helps to prevent "rat holing" and allowing water to break through the outlet of the tank.

The starch cake exits onto a conveyor belt or otherwise moved to a packaging area or directly into a starch processing area. In another embodiment, the starch exits into a tote or a bag (12). The tote or bulk bag may be any commercially produced version. The tote or bulk bag is preferably manufactured without a non-porous coating or other moisture barrier. A non-porous coating will prevent moisture from migrating through the cake and out the walls of the tote or bag. In one embodiment, the tote or bag is sufficiently permeable to allow the starch moisture to decrease, and in one embodiment is comprised of polypropylene or nylon.

In one embodiment, the starch cake exits the tank directly into a permeable bulk bag. The bulk bag may optionally be placed on a scale (13), such as a flat floor scale, which is integrated with the controller. This set-up allows the controller to automatically close the tank orifice at a prescribed weight (as measured by the scale), The operator can then remove the bulk bag.

Starch cake typically exits the settling tank at from about 40-60 (w/w) % moisture by weight, and in one embodiment at about 50-55 (w/w) % moisture by weight. The starch may be further dried using equipment known in the art, used as is, or allowed to dry by storing or transporting in a dry environment. A dry environment may be ambient air or may be artificially dried. In one embodiment, a bulk bag of starch is allowed to dry under indoor ambient conditions until the moisture throughout the cake reaches a desired range. In one embodiment, the moisture content is 40-50% (w/w) and in another embodiment 45-48% (w/w). The combination of these moisture levels and the nature of the hard packing of the starch in the bag prevent unacceptable bacterial and mold growth. This is important in maintaining proper quality.

In one embodiment, bacteria and mold growth may be further prevented by the use of any antimicrobial known in the art. The antimicrobial may be used at any point in the process. In one embodiment, the antimicrobial is sprayed onto the wet cake as it exits the settling tank. In another embodiment, the antimicrobial is added near the top of the settling tank or at the point where the underflow from the classifier is introduced into the stilling well or settling tank. In yet another embodiment, the antimicrobial is added near the bottom of the settling tank, but before the starch exits through the orifice.

The following examples are presented to further illustrate and explain the present invention and should not be taken as limiting in any regard. All percents used are on a weight/weight basis.

EXAMPLES

Example 1

Dilute starch water from the potato processor was screened through a Sweco screener to remove pulp and peel, which was discarded. The flow rate of dilute starch water from the process was determined to be approximately 110 gallons/minute (gpm). The screened starch water was then pumped through three hydrocyclones in parallel to concentrate it at a ratio of 33 to 1. Together, the hydrocyclones produced about 3 gpm of semi-concentrated starch slurry.

This 3 gallons per minute slurry stream flowed into a stilling well atop the settling tank, which quieted and dispersed the liquid evenly throughout the tank. The starch, being heavier than water, settled out. As the starch settled, the clear water cascaded over the edges of the tank and into a gutter. It was clean enough to be re-used in the plant.

The layer of settled starch was discharged from the settling tank using an oversized valve (12" slide gate). In order to maintain a level of starch sufficient to prevent water from breaking through the starch and out the tank orifice, an underwater sonar was used to sense the "lake bottom". The slide gate was opened and closed to maintain the starch level at the desired height within the tank.

Starch cake exited the settling tank through the orifice and into a polypropylene bulk bag. To prevent a concave area on the surface of the lake bottom and thus water breaking through the starch cake and spilling out of the tank bottom, an inverted cone was used and was adjusted up or down as needed to control the flow of starch cake out of the bottom of the tank. The exiting starch cake had a moisture of 55% moisture by weight as it entered the bulk bag. When the starch in the bag reached 2000 lbs., the bag was moved off the scale and set aside in a dry (ambient) storage area. Water evaporated and/or wept out of the bag while the starch cake was retained. After two weeks the cake moisture was about 48% by weight. Testing indicated no increase in bacterial or mold growth during this time Example 2

Example 1 was repeated using load cells instead of underwater sonar, The load cells measured the total weight of the starch plus water in the settling tank and the output from the load cells was used to control the level of starch in the tank.

What is claimed is:

1. A process consisting essentially of:
   a. obtaining a waste water stream having starch content between 0.1 and 5% by weight starch and feeding the waste water stream to a classifier to concentrate the slurry by a factor of at least 5 and produce a concentrated slurry, wherein the classifier has at least one overflow exit and at least one underflow exit;
   b. drawing off the overflow and underflow from the classifier;
   c. feeding the concentrated slurry from the underflow exit of the classifier into a settling tank having at least one settling tank underflow exit and at least one settling tank overflow exit, to produce a settling tank underflow layer of starch with a concentration of between 40 and 60% starch, the settling tank underflow layer being proximate to the settling tank's underflow exit and an aqueous settling tank overflow layer having a starch concentration of less than 5% by weight starch proximate to the settling tank overflow exit,
   d. allowing the settling tank underflow layer to exit through the settling tank underflow exit as a starch cake having moisture content between 40 and 60%; and
   e. collecting the starch cake for shipping.

2. The process of claim 1, further comprising feeding the concentrated slurry from the underflow exit of the classifier into a stilling well prior to the settling tank.

3. The process of claim 1, further comprising screening the waste water stream prior to feeding it into the classifier.

4. The process of claim 1, wherein the screening removes solids greater than 53 microns.

5. The process of claim 1, wherein the screening removes solids greater than 250 microns.

6. The process of claim 1, further comprising adding an antimicrobial to either the concentrated slurry or the starch cake.

7. The process of claim 1, wherein the settling tank further comprises a means for opening and closing the underflow exit.

8. The process of claim 7, further comprising opening and closing the underflow exit of the settling tank using such means.

9. The process of claim 1, wherein the settling tank further comprises a gate valve coupled to the underflow exit.

10. The process of claim 1, wherein the settling tank contains a sensor which determines the location of an interface between the settling tank underflow layer and the settling tank overflow layer.

11. The process of claim 1, wherein the settling tank further comprises a slide valve for opening and closing the settling tank underflow exit, a sensor for sensing an interface between the settling tank underflow layer and the settling tank aqueous overflow layer, and a controller operatively connected between the slide valve and a controller such that
   i) the controller moves the slide valve in a first direction to open the settling tank underflow exit when the sensor detects that the interface reaches a predetermined level, thereby allowing the settling tank underflow layer to exit the settling tank as starch cake, and
   ii) the controller moves the slide valve in a second direction to close the underflow exit when the sensor detects that the interface reaches a second predetermined level.

12. The process of claim 1, wherein the settling tank further comprises an inverted restriction cone immovably but adjustably disposed above the settling tank underflow exit of the settling tank to restrict the rate of flow of the settling tank underflow layer through the settling tank underflow exit.

13. The process of claim 1, further comprising after the starch cake is collected but prior to shipping, allowing the collected starch cake to dry to a moisture content of 40-50 (w/w) %.

14. The process of claim 1 further comprising collecting the starch cake in a permeable tote or bag.

* * * * *